US012314341B2

(12) United States Patent
Han et al.

(10) Patent No.: US 12,314,341 B2
(45) Date of Patent: May 27, 2025

(54) METHOD AND APPARATUS FOR TRAINING EMBEDDING VECTOR GENERATION MODEL

(71) Applicant: Samsung Electronics Co., Ltd., Suwon-si (KR)

(72) Inventors: GyuBum Han, Suwon-si (KR); Jehun Jeon, Suwon-si (KR); Inkyu Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 503 days.

(21) Appl. No.: 17/153,011

(22) Filed: Jan. 20, 2021

(65) Prior Publication Data

US 2022/0058433 A1 Feb. 24, 2022

(30) Foreign Application Priority Data

Aug. 19, 2020 (KR) ........................ 10-2020-0104025

(51) Int. Cl.
*G06F 18/20* (2023.01)
*G06F 16/33* (2025.01)
*G06F 18/214* (2023.01)
*G06F 18/22* (2023.01)
(Continued)

(52) U.S. Cl.
CPC ............ *G06F 18/214* (2023.01); *G06F 18/22* (2023.01); *G06F 40/295* (2020.01); *G06F 40/30* (2020.01)

(58) Field of Classification Search
USPC ............ 382/154–159; 704/1–275; 706/1–62, 706/900–903; 707/706–780
See application file for complete search history.

(56) References Cited

U.S. PATENT DOCUMENTS

| 9,852,177 | B1 | 12/2017 | Cheung et al. |
| 2017/0316775 | A1 | 11/2017 | Le et al. |
| 2018/0144234 | A1 | 5/2018 | Devesa |

(Continued)

FOREIGN PATENT DOCUMENTS

| CN | 110147882 A | 8/2019 |
| JP | 4987530 B2 | 7/2012 |

(Continued)

OTHER PUBLICATIONS

Palangi, Hamid, et al., "Deep Sentence Embedding using Long Short-Term Memory Networks: Analysis and Application to Information Retrieval," *IEEE/ACM Transactions on Audio, Speech, and Language Processing*, 24, 4, Jan. 16, 2016 (pp. 694-707).

(Continued)

*Primary Examiner* — Marcellus J Augustin
(74) *Attorney, Agent, or Firm* — NSIP Law (57) ABSTRACT

A method and apparatus for training an embedding vector generation model are provided, the method includes identifying a keyword in a query sentence, generating an embedding vector of the query sentence and an embedding vector of the keyword based on the embedding vector generation model, and training the embedding vector generation model such that a first similarity between the embedding vector of the query sentence and the embedding vector of the keyword is greater than a second similarity between an embedding vector of a reference sentence that does not include the keyword and the embedding vector of the keyword.

20 Claims, 5 Drawing Sheets

(51) Int. Cl.
    *G06F 40/295*    (2020.01)
    *G06F 40/30*     (2020.01)

(56) References Cited

U.S. PATENT DOCUMENTS

| | | | |
|---|---|---|---|
| 2020/0026959 A1* | 1/2020 | Lee | G06F 18/214 |
| 2020/0081982 A1* | 3/2020 | Tu | G06N 3/047 |
| 2020/0125673 A1* | 4/2020 | Aharonov | G06F 18/22 |
| 2021/0056169 A1* | 2/2021 | Bahirwani | G06F 40/295 |
| 2021/0141798 A1* | 5/2021 | Steedman Henderson | G06F 16/3344 |
| 2021/0200813 A1* | 7/2021 | Xu | G06F 16/3347 |
| 2021/0319051 A1* | 10/2021 | Duan | G06F 16/00 |
| 2022/0301072 A1* | 9/2022 | Wang | G06F 40/279 |
| 2022/0318507 A1* | 10/2022 | Barkan | G06F 16/34 |

FOREIGN PATENT DOCUMENTS

| | | |
|---|---|---|
| JP | 6679683 B2 | 4/2020 |
| KR | 10-2055899 B1 | 12/2019 |

OTHER PUBLICATIONS

Kim, Bosung, et al., "An Effective Sentence Similarity Measure Method Based FAQ System Using Self-Attentive Sentence Embedding," *Annual Conference on Human and Language Technology. Human and Language Technology*, 2018 (3 pages in English and 3 pages in Korean).

Oh, Kyo-Joong, et al., "Question Understanding Based on Sentence Embedding on Dialog Systems for Banking Service." *2019 IEEE International Conference on Big Data and Smart Computing (BigComp). IEEE*, 2019 (1 pages in English).

Miao, Changyu, et al., "Keyword-Attentive Deep Semantic Matching," *arXiv preprint arXiv:2003.11516*, 2020, (pp. 1-13).

* cited by examiner

METHOD AND APPARATUS FOR TRAINING EMBEDDING VECTOR GENERATION MODEL

CROSS-REFERENCE TO RELATED APPLICATIONS

This application claims the benefit under 35 USC § 119(a) of Korean Patent Application No. 10-2020-0104025, filed on Aug. 19, 2020, in the Korean Intellectual Property Office, the entire disclosure of which is incorporated herein by reference for all purposes.

BACKGROUND

Field

The following description relates to training of an embedding vector generation model.

2. DESCRIPTION OF RELATED ART

A chatbot system outputs a response sentence corresponding to a sentence input by a user, and includes, for example, a retrieval model-based chatbot system. In a retrieval model, candidates of an input sentence are vectorized and arranged in an embedding space. If a user's query sentence is input to the retrieval model, the retrieval model may vectorize the input sentence and output a response sentence mapped to the closest candidate in the embedding space.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of training an embedding vector generation model, the method including identifying a keyword in a query sentence, generating an embedding vector of the query sentence and an embedding vector of the keyword based on the embedding vector generation model, and training the embedding vector generation model such that a first similarity between the embedding vector of the query sentence and the embedding vector of the keyword is greater than a second similarity between an embedding vector of a reference sentence that does not include the keyword and the embedding vector of the keyword.

The generating of the embedding vectors may include generating the embedding vector of the query sentence and the embedding vector of the keyword based on a pre-trained embedding vector generation model, and the training of the embedding vector generation model may include fine tuning the embedding vector generation model such that the first similarity is greater than the second similarity.

The embedding vector generation model may be pre-trained based on any one or any combination of a general sentence and a conversational sentence, and the keyword may include at least one word in the query sentence and a length of the keyword is less than a length of the general sentence or the conversational sentence.

The training of the embedding vector generation model may include training the embedding vector generation model such that a similarity of the embedding vector of the keyword output from the embedding vector generation model to the embedding vector of the query sentence is greater than a similarity of the embedding vector of the reference sentence to the embedding vector of the query sentence, in response to the keyword being input to the embedding vector generation model.

The reference sentence may not include the keyword and may be selected from among sentences belonging to a category that is different from a category of the query sentence.

The identifying of the keyword may include identifying the keyword in the query sentence based on any one or any combination of pre-tagged information in the query sentence or by performing named entity recognition (NER) on the query sentence.

The embedding vector generation model may be an encoder corresponding to a language model.

The embedding vector of the query sentence may be fine-tuned based on identification information corresponding to the query sentence, and the embedding vector generation model may be fine-tuned based on the fine-tuned embedding vector of the query sentence.

The fine-tuned embedding vector of the query sentence may have a same number of dimensions as a number of dimensions of the embedding vector of the query sentence.

The query sentence may be acquired from text data input by a user or a voice signal uttered by the user.

In another general aspect, there is provided an apparatus for training an embedding vector generation model, the apparatus including a memory configured to store the embedding vector generation model, and a processor configured to generate an embedding vector of a query sentence and an embedding vector of a keyword identified in the query sentence, based on the embedding vector generation model, and train the embedding vector generation model such that a first similarity between the embedding vector of the query sentence and the embedding vector of the keyword is greater than a second similarity between an embedding vector of a reference sentence that does not include the keyword and the embedding vector of the keyword.

The processor may be configured to train the embedding vector generation model such that a similarity of the embedding vector of the keyword output from the embedding vector generation model to the embedding vector of the query sentence is greater than a similarity of the embedding vector of the reference sentence to the embedding vector of the query sentence, in response to the keyword being input to the embedding vector generation model.

The processor may be configured to generate the embedding vector of the query sentence and the embedding vector of the keyword based on a pre-trained embedding vector generation model, and perform fine tuning of the embedding vector generation model such that the first similarity is greater than the second similarity.

The embedding vector generation model may be pre-trained based on any one or any combination of a general sentence and a conversational sentence, and the keyword may include at least one word in the query sentence and a length of the keyword is less than a length of the general sentence or the conversational sentence.

The reference sentence may not include the keyword and may be selected from among sentences belonging to a category that is different from a category of the query sentence.

The processor may be configured to identify the keyword in the query sentence based on any one or any combination of pre-tagged information in the query sentence or by performing named entity recognition (NER) on the query sentence.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Figure 1:
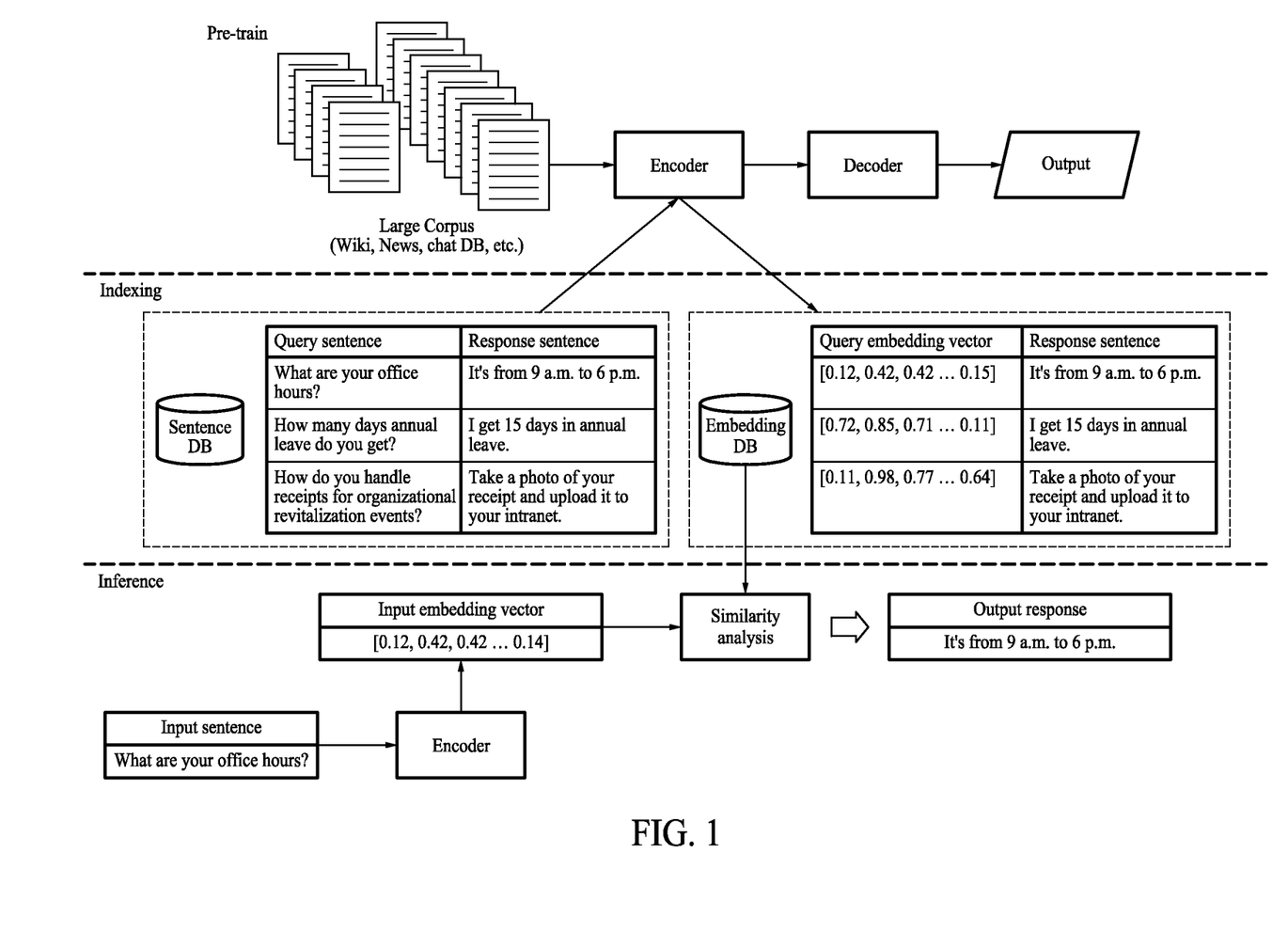
FIG. 1 illustrates an example of a retrieval-based conversation apparatus.

Hereinafter, examples will be described in detail with reference to the accompanying drawings, and like reference numerals in the drawings refer to like elements throughout. FIG. 1 illustrates an example of a retrieval-based conversation apparatus.

The retrieval-based conversation apparatus may determine a response sentence for a sentence input from a user, and may include, for example, a chatbot system. To determine a response sentence in a conversation apparatus, a retrieval model may be used. The retrieval model may retrieve a query sentence that is most similar to an input sentence of a user from a database (DB) in which a plurality of pairs of query sentences and response sentences are stored, and may output a response sentence corresponding to the retrieved query sentence as a response to the input sentence. The conversation apparatus may use sentence embedding that expresses a sentence as a vector. Candidate query sentences to be used for conversation may be set in advance, and all candidate queries may be located in a vector space based on the sentence embedding. Also, a sentence input from an actual user may be expressed as a vector by applying the sentence embedding to the sentence, mapping to a candidate query sentence having a highest similarity (or a closest distance) in the vector space among the candidate query sentences may be performed, and a response sentence corresponding to the candidate query sentence may be output, to perform a conversation. A similarity may be based on a cosine similarity, but is not limited thereto, and various similarity determination methods may be applied without a limitation.

Referring to FIG. 1, a pre-training process, an indexing process and an inference process are illustrated.

In an example, an encoder and a decoder included in the retrieval model may be pre-trained based on a large quantity of corpus data. When corpus data used in the pre-training process is in a form of a question and an answer, the question and the answer may be configured as a single pair of training data. For example, in response to an input of a question sentence to the encoder, the encoder and the decoder may be pre-trained such that the encoder may output an embedding vector of the question sentence as context information and that the decoder may output an appropriate answer sentence based on the context information. When the corpus data used in the pre-training process is wiki data, a present sentence and a next sentence may be configured as a single pair of training data. Similarly, the encoder and the decoder may be pre-trained such that the decoder may output the next sentence in response to the present sentence being input to the encoder.

The corpus data used in the pre-training process may be associated with words, predicates, and the like that are commonly used and are not focused on a predetermined field, and may include, for example, a relatively long sentence and/or conversational sentence having a length greater than a threshold length. Through the pre-training process, the retrieval model with high understanding of a language, a conversation and context itself may be obtained.

In the indexing process, embedding vector conversion may be performed using the pre-trained encoder. A sentence DB may store a plurality of pairs of query sentences and response sentences. By inputting a query sentence to the encoder, an embedding vector of the query sentence may be obtained from the encoder. An embedding DB may store a plurality of pairs of query embedding vectors and response sentences.

In the inference process, a sentence may be input from a user. For example, an input sentence may be determined from text data input by the user or a voice signal uttered by the user. The sentence input from the user may be converted to an input embedding vector by the above-described encoder. A similarity between the input embedding vector and each of the plurality of query embedding vectors stored in the embedding DB may be determined. A query embedding vector with a highest similarity to the input embedding vector may be selected, and a response sentence corresponding to the selected query embedding vector may be output as a response to the input sentence of the user. The encoder that generates an embedding vector may be referred to as an "embedding vector generation model" for convenience of description.

For example, when a sentence "What are your office hours?" is input from a user, the encoder may generate an input embedding vector [0.12, 0.42, 0.42 . . . 0.14] based on the input sentence. In the embedding DB, a query embedding vector [0.12, 0.42, 0.42 . . . 0.15] that is most similar to the input embedding vector [0.12, 0.42, 0.42 . . . 0.14] may be identified. As a result, a response sentence "It's from 9 a.m. to 6 p.m." corresponding to the identified query embedding vector [0.12, 0.42, 0.42 . . . 0.15] may be output as a response.

If the user enters only a keyword "office hours", instead of a conversational sentence, it is reasonable to assume that the user still has an intention to know the office hours, and accordingly the query embedding vector [0.12, 0.42, 0.42 . . . 0.15] that is most similar to an embedding vector corresponding to the keyword "office hours" may need to be identified. However, because the encoder is pre-trained based on a conversational sentence and/or a long sentence having a length greater than a threshold length, as described above, and an embedding vector of the conversational sentence and/or the long sentence is calculated in a form of a weighted sum of all words of the conversational sentence and/or the long sentence, it may be relatively difficult to retrieve a keyword with a relatively short length, and fine tuning may be additionally performed to output an appropriate response. Hereinafter, examples will be further described with reference to the drawings.

Figure 2:
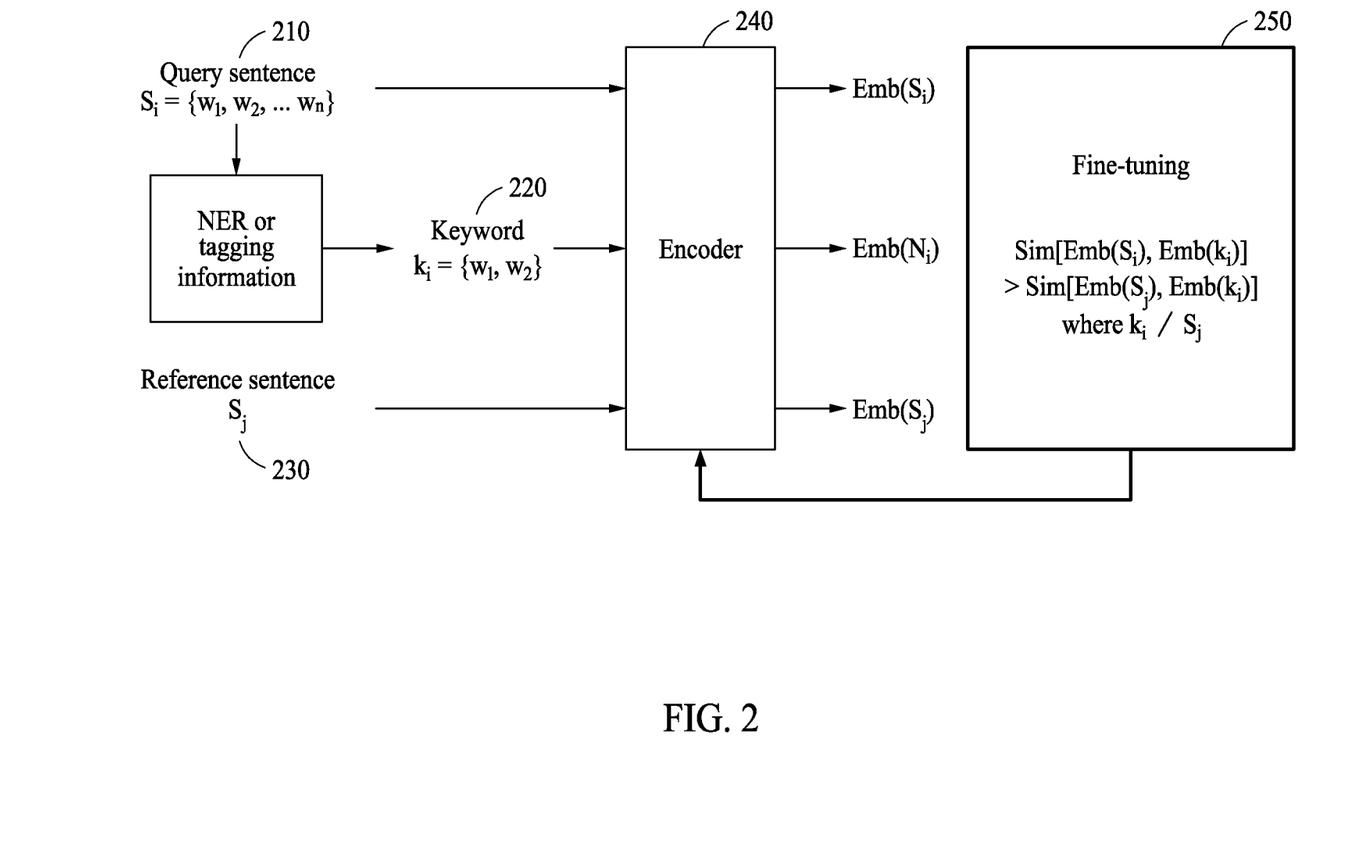
FIGS. 2 and 3 illustrate examples of a process of training an encoder.
Figure 3:
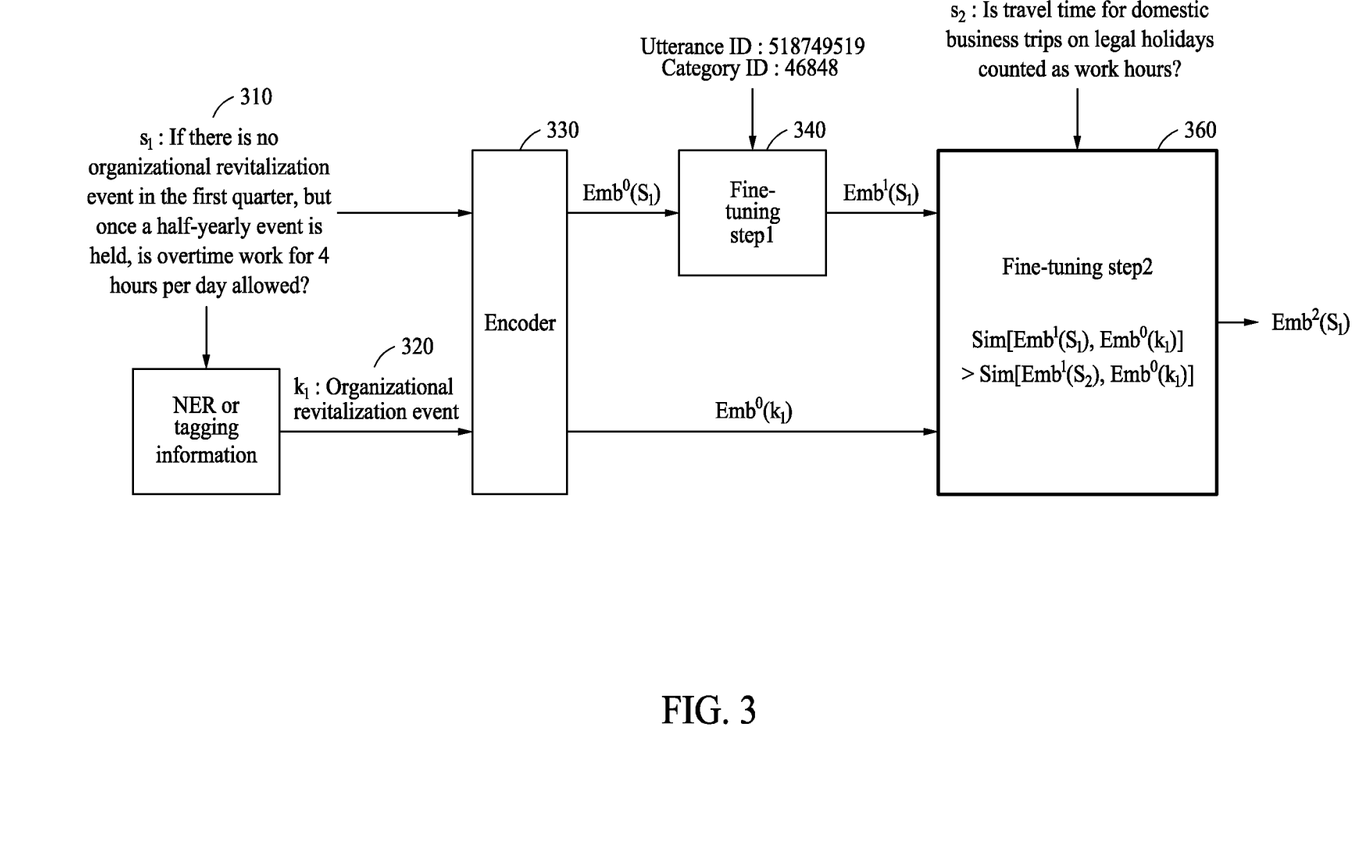

FIGS. 2 and 3 illustrate examples of a process of training an encoder.

FIG. 2 illustrates an example of performing fine tuning 250 of an encoder 240 based on a keyword 220. The encoder 240 may be a model that is pre-trained based on a large quantity of corpus data, as described above, and the fine tuning 250 that will be described below may be additionally performed on the encoder 240 to enable an effective conversation even in a relatively short conversation based on keywords. For example, the encoder 240 may be a recurrent neural network (RNN), or a transformer-based neural network.

A query sentence 210 may include "n" tokens. For example, a token may correspond to a morpheme, which is the smallest unit of words with meaning, however, examples are not limited thereto. The keyword 220 may be identified in the query sentence 210 based on named entity recognition (NER) or tagging information. Although the keyword 220 includes two tokens as shown in FIG. 2 for convenience of description, a number of tokens is not limited thereto when a length of the keyword 220 is less than a length of the query sentence 210. Also, although one keyword, i.e., keyword 220 is included in the query sentence 210 as shown in FIG. 2 for convenience of description, the following description may equally be applicable to an example in which a plurality of keywords are included in the query sentence 210.

The NER may be an information extraction scheme of retrieving a type of named entities, and the tagging information may include information indicating what the keyword 220 is in the query sentence 210 by, for example, a user. In an example, when tagging information is included in the query sentence 210, the keyword 220 may be identified in the query sentence 210 based on the tagging information. In another example, when the tagging information is absent, the keyword 220 may be extracted from the query sentence 210 based on the NER.

Also, a reference sentence 230 that does not include the keyword 220 may be used in the fine tuning 250. The reference sentence 230 may be randomly determined as one of sentences that do not include the keyword 220 through negative sampling. For example, the reference sentence 230 may be determined as a sentence that does not include the keyword 220 among sentences belonging to a different category from that of the query sentence 210. Depending on examples, when a plurality of keywords 220 are provided, a sentence that does not include all the plurality of keywords 220 may be selected through negative sampling.

The query sentence 210, the keyword 220 and the reference sentence 230 may be respectively input to the encoder 240, and an embedding vector of each of the query sentence 210, the keyword 220, and the reference sentence 230 may be determined. Based on embedding vectors of the query sentence 210, the keyword 220 and the reference sentence 230 may, the encoder 240 may be fine-tuned. For example, a loss function may be determined such that a first similarity between an embedding vector $Emb(S_i)$ of the query sentence 210 and an embedding vector $Emb(N_i)$ of the keyword 220 may be greater than a second similarity between an embedding vector $Emb(S_i)$ of the reference sentence 230 and the embedding vector $Emb(N_i)$ of the keyword 220, and the encoder 240 may be fine-tuned to reduce a loss determined based on the loss function. When the first similarity is less than the second similarity, a great loss for the loss function may be determined. When the first similarity is greater than the second similarity, a relatively small loss for the loss function may be determined.

Through the above-described fine tuning 250, the encoder 240 may be fine-tuned to allow the embedding vector $Emb(S_i)$ of the query sentence 210 including the keyword 220 to be similar to the embedding vector $Emb(N_i)$ of the keyword 220 than the embedding vector $Emb(S_i)$ of the reference sentence 230 that does not include the keyword 220, and accordingly a significant conversation performance may be obtained even in a relatively short keyword-based conversation. For example, when the above-described fine tuning 250 is applied to a retrieval-based conversation apparatus that uses the encoder 240 pre-trained based on a large quantity of corpus data including a relatively long sentence or a conversational sentence, a high-level response sentence may be provided to a user even though the user enters a relatively short keyword instead of a conversational sentence.

Depending on examples, when a plurality of keywords are provided, the above-described fine tuning 250 may be performed on each of the plurality of keywords. For example, a process of fine tuning the encoder 240 such that the embedding vector $Emb(S_i)$ of the query sentence 210 including the plurality of keywords is similar to an embedding vector $Emb(N_{ip})$ of a p-th keyword included in the query sentence 210 than the embedding vector $Emb(S_i)$ of the reference sentence 230 that does not include the plurality of keywords may be performed on each of the plurality of keywords.

The entire process of the above-described fine tuning 250 may be configured and performed by an end-to-end (E2E) network. In an example of an encoder, a pre-trained network parameter may be fixed, and fine tuning may be performed on the other network parameters.

FIG. 3 illustrates an example of fine tuning an encoder 330 based on a keyword 320. The encoder 330 may be a model that is pre-trained based on a large quantity of corpus data, as described above.

In an example, in a retrieval-based conversation apparatus, identification information, for example, an identifier (ID), may be assigned to candidate query sentences. Also, the keyword 320 may be labelled to the candidate query sentences based on NER or tagging information.

The encoder 330 may determine an embedding vector of each of a query sentence 310 and the keyword 320. First fine tuning 340 may be performed on an embedding vector $Emb^0(S_1)$ of the query sentence 310 based on identification information, for example, an utterance ID and/or category ID. Query sentences in the example of FIG. 3 are shown in Table 1 below.

TABLE 1

| Utterance ID | Category ID | Utterance |
|---|---|---|
| 518749519 | 46848 | If there is no organizational revitalization event in the first quarter, but once a half-yearly event is held, is overtime work for 4 hours per day allowed? |
| 597379191 | 47749 | Is travel time for domestic business trips on legal holidays counted as work hours? |

For example, the first fine tuning 340 may be performed such that query sentences with the same identification information may have relatively close embedding vectors and that query sentences with different pieces of identification information may have relatively distant embedding vectors. In this example, an embedding vector $Emb^1(S_1)$ obtained by performing the first fine tuning 340 may have the same vector dimension as that of the embedding vector $Emb^0(S_1)$ on which the first fine tuning 340 is not performed. However, examples are not limited to the first fine tuning 340, and other sentence embedding fine-tuning schemes may also be applied without a limitation.

A first similarity between the embedding vector $Emb^1(S_1)$ to which the first fine tuning 340 is applied and an embedding vector $Emb^0(k_1)$ of the keyword 320 may be calculated, and a second similarity between the embedding vector $Emb^0(k_1)$ of the keyword 320 and an embedding vector $Emb^1(S_2)$ of a reference sentence 350 that does not include the keyword 320 and that is obtained through negative sampling may be calculated. When the first similarity is greater than the second similarity, second fine tuning 360 may be performed in the encoder 330 to reduce a loss.

Figure 4:
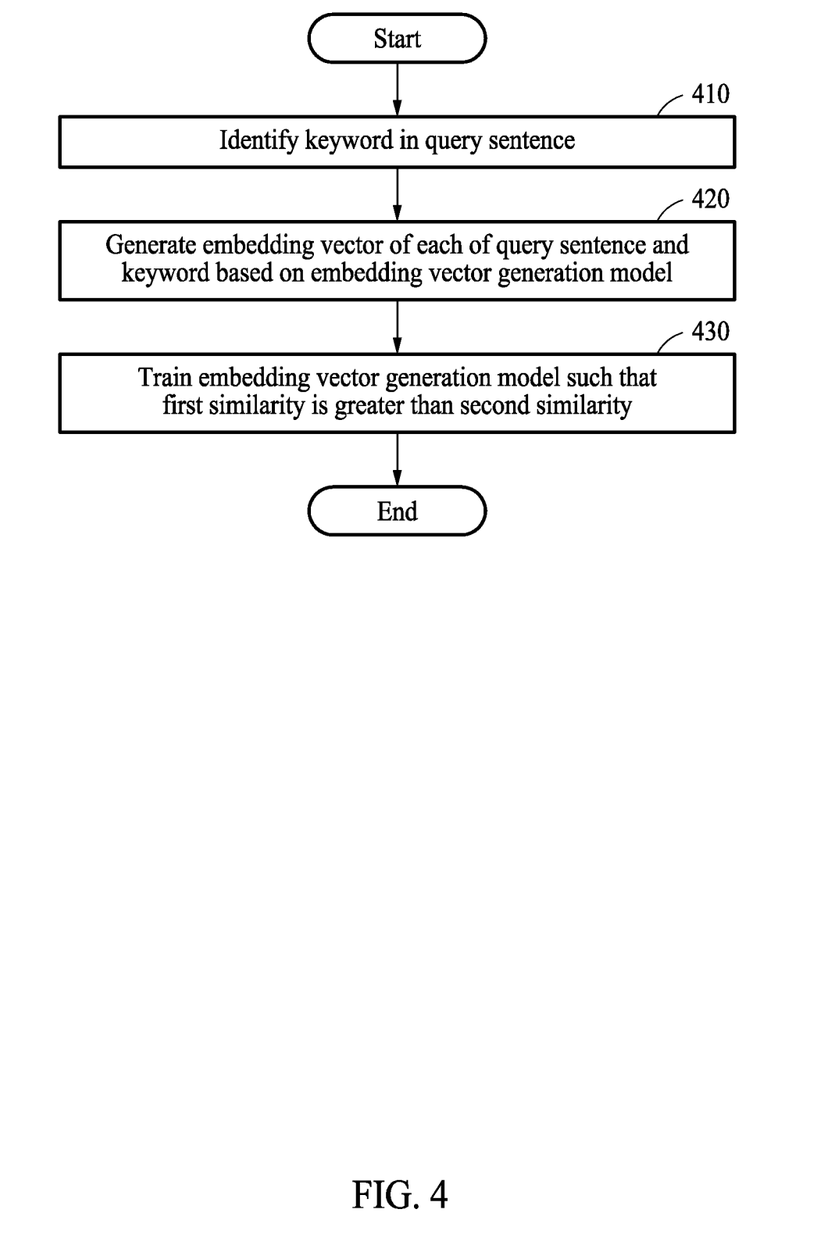
FIG. 4 illustrates an example of a method of training an embedding vector generation model.

FIG. 4 illustrates an example of a method of training an embedding vector generation model. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as, for example, a processor included in an apparatus (hereinafter, referred to as a model training apparatus) for training an embedding vector generation model. In addition to the description of FIG. 4 below, the descriptions of FIGS. 1-3 are also applicable to FIG. 4, and are incorporated herein by reference. Thus, the above description may not be repeated here.

In operation 410, the model training apparatus identifies a keyword in a query sentence. The keyword may be at least one word included in the query sentence and may have a length less than that of the query sentence. For example, the model training apparatus may identify the keyword in the query sentence by performing NER on the query sentence or based on pre-tagged information in the query sentence. Also, the query sentence may be acquired from text data input by a user or a voice signal uttered by the user.

In operation 420, the model training apparatus generates an embedding vector of the query sentence and an embedding vector of the keyword based on the embedding vector generation model. The model training apparatus may generate the embedding vector of the query sentence and the embedding vector of the keyword based on a pre-trained embedding vector generation model.

In operation 430, the model training apparatus trains the embedding vector generation model such that a first similarity between the embedding vector of the query sentence and the embedding vector of the keyword is greater than a second similarity between an embedding vector of a reference sentence that does not include the keyword and the embedding vector of the keyword. Training of the embedding vector generation model may include fine tuning the embedding vector generation model. For example, the model training apparatus may fine tune the embedding vector generation model such that the first similarity may be greater than the second similarity.

The embedding vector generation model may be pre-trained based on a conversational sentence and/or a long sentence with a length greater than or equal to a threshold length which are included in a large quantity of corpus data about commonly used words or predicates that are commonly used and are not focused on a predetermined field. The embedding vector generation model may be an encoder corresponding to a language model. The reference sentence may be selected as a sentence that does not include a keyword from among sentences belonging to a different category from that of the query sentence.

In an example, when a keyword is input to the embedding vector generation model, the model training apparatus may train the embedding vector generation model such that the embedding vector of the keyword output from the embedding vector generation model may be more similar to the embedding vector of the query sentence than the embedding vector of the reference sentence.

Figure 5:
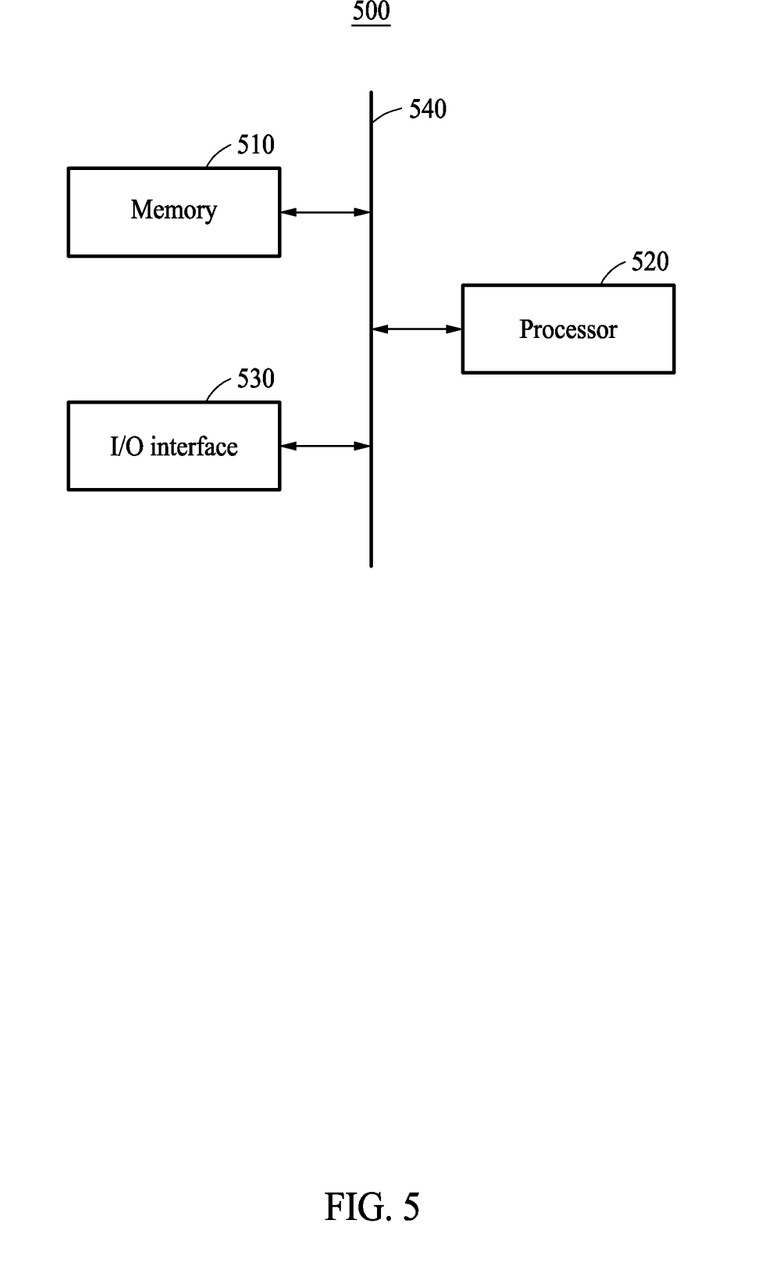
FIG. 5 illustrates an example of an apparatus for training an embedding vector generation model.

FIG. 5 illustrates an example of a model training apparatus 500 for training an embedding vector generation model.

Referring to FIG. 5, the model training apparatus 500 includes a memory 510, a processor 520, and an input/output (I/O) interface 530. The memory 510, the processor 520 and the I/O interface 530 may communicate with each other via a bus 540.

The memory 510 may include a computer-readable instruction. The processor 520 may perform the above-describe operations by executing an instruction stored in the memory 510. The memory 510 may include, for example, a volatile memory or a nonvolatile memory. Further details regarding the memory 510 is provided below.

The processor 520 may be an apparatus configured to execute instructions or programs, or to control the model training apparatus 500, and may include, for example, a central processing unit (CPU), a graphics processor unit (GPU), a neural processing unit (NPU), or a tensor processing unit (TPU). Further details regarding the processor 520 is provided below.

The model training apparatus 500 may be connected to an external device, for example, a microphone or a keyboard, via the I/O interface 530, to receive an input sentence of a user or to output a response sentence. For example, the model training apparatus 500 may be implemented as a portion of, for example, various computing devices such as a smartphone, a tablet computer, a laptop computer or a personal computer (PC), various wearable devices such as a smartwatch or smart glasses, various home appliances such as a smart speaker, a smart television (TV) or a smart refrigerator, a smart vehicle, a smart kiosk, an Internet of Thins (IoT) device, a drone, or a robot. In addition, the processor 520 may process the above-described operations of the model training apparatus 500.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a field-programmable gate array (FPGA), an application-specific integrated circuit (ASIC), a programmable logic unit (PLU), a central processing unit (CPU), a graphics processing unit (GPU), a neural processing unit (NPU), a tensor processing unit (TPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of training an embedding vector generation model. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RW, DVD-ROMs, DVD-Rs, DVD+Rs, DVD-RWs, DVD+RW, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of training an embedding vector generation model, the method comprising:
   identifying a keyword in a query sentence;
   generating an embedding vector of the query sentence and an embedding vector of the keyword based on the embedding vector generation model; and
   training the embedding vector generation model such that a first similarity between the embedding vector of the query sentence and the embedding vector of the keyword is greater than a second similarity between an embedding vector of a reference sentence and the embedding vector of the keyword,
   wherein the embedding vector generation model is pre-trained based on any one or any combination of a general sentence and a conversational sentence, and
   wherein the keyword comprises at least one word in the query sentence and a length of the keyword is less than a length of the general sentence or the conversational sentence.

2. The method of claim 1, wherein
   the generating of the embedding vectors comprises generating the embedding vector of the query sentence and the embedding vector of the keyword based on a pre-trained embedding vector generation model, and
   the training of the embedding vector generation model comprises fine tuning the embedding vector generation model such that the first similarity is greater than the second similarity.

3. The method of claim 1, wherein the training of the embedding vector generation model comprises training the embedding vector generation model such that a similarity of the embedding vector of the keyword output from the embedding vector generation model to the embedding vector of the query sentence is greater than a similarity of the embedding vector of the reference sentence to the embedding vector of the query sentence, in response to the keyword being input to the embedding vector generation model.

4. The method of claim 1, wherein the reference sentence does not include the keyword and is selected from among sentences belonging to a category that is different from a category of the query sentence.

5. The method of claim 1, wherein the identifying of the keyword comprises identifying the keyword in the query sentence based on any one or any combination of pre-tagged information in the query sentence or by performing named entity recognition (NER) on the query sentence.

6. The method of claim 1, wherein the embedding vector generation model is an encoder corresponding to a language model.

7. The method of claim 1, wherein
   the embedding vector of the query sentence is fine-tuned based on identification information corresponding to the query sentence, and
   the embedding vector generation model is fine-tuned based on the fine-tuned embedding vector of the query sentence.

8. The method of claim 7, wherein the fine-tuned embedding vector of the query sentence has a same number of dimensions as a number of dimensions of the embedding vector of the query sentence.

9. The method of claim 1, wherein the query sentence is acquired from text data input by a user or a voice signal uttered by the user.

10. A non-transitory computer-readable storage medium storing instructions that, when executed by a processor, cause the processor to perform the method of claim 1.

11. The method of claim 1, further comprising:
    generating the embedding vector of the reference sentence;
    determining the first similarity and the second similarity.

12. The method of claim 1, wherein the reference sentence does not include the keyword and is determined from a different category than the query sentence.

13. The method of claim 1, wherein the reference sentence does not include the keyword and is selected based on the keyword.

14. An apparatus for training an embedding vector generation model, the apparatus comprising:
    a memory configured to store the embedding vector generation model; and
    a processor configured to:
       generate an embedding vector of a query sentence and an embedding vector of a keyword identified in the query sentence, based on the embedding vector generation model; and
       train the embedding vector generation model such that a first similarity between the embedding vector of the query sentence and the embedding vector of the keyword is greater than a second similarity between an embedding vector of a reference sentence and the embedding vector of the keyword, wherein the embedding vector generation model is pre-trained based on any one or any combination of a general sentence and a conversational sentence, and wherein the keyword comprises at least one word in the query sentence and a length of the keyword is less than a length of the general sentence or the conversational sentence.

15. The apparatus of claim 14, wherein the processor is further configured to train the embedding vector generation model such that a similarity of the embedding vector of the keyword output from the embedding vector generation model to the embedding vector of the query sentence is greater than a similarity of the embedding vector of the reference sentence to the embedding vector of the query sentence, in response to the keyword being input to the embedding vector generation model.

16. The apparatus of claim 14, wherein the processor is further configured to:

generate the embedding vector of the query sentence and the embedding vector of the keyword based on a pre-trained embedding vector generation model; and perform fine tuning of the embedding vector generation model such that the first similarity is greater than the second similarity.

17. The apparatus of claim 14, wherein the reference sentence does not include the keyword and is selected from among sentences belonging to a category that is different from a category of the query sentence.

18. The apparatus of claim 14, wherein the processor is further configured to identify the keyword in the query sentence based on any one or any combination of pre-tagged information in the query sentence or by performing named entity recognition (NER) on the query sentence.

19. The apparatus of claim 14, wherein the processor is further configured to:

generate the embedding vector of the reference sentence; and determine the first similarity and the second similarity.

20. The apparatus of claim 14, wherein the reference sentence does not include the keyword and is selected based on the keyword.

* * * * *